United States Patent
Gansley

(10) Patent No.: US 11,091,378 B2
(45) Date of Patent: Aug. 17, 2021

(54) SYSTEMS AND METHODS OF REDUCING SELENIUM CONTAMINATION IN WASTE WATER

(71) Applicant: General Electric Company, Schenectady, NY (US)

(72) Inventor: Raymond Raulfs Gansley, Knoxville, TN (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 16/361,325

(22) Filed: Mar. 22, 2019

(65) Prior Publication Data
US 2020/0299156 A1    Sep. 24, 2020

(51) Int. Cl.
| | |
|---|---|
| *B01D 53/34* | (2006.01) |
| *C02F 1/52* | (2006.01) |
| *C02F 101/10* | (2006.01) |
| *B01D 53/50* | (2006.01) |
| *C02F 1/54* | (2006.01) |

(52) U.S. Cl.
CPC .......... *C02F 1/5209* (2013.01); *B01D 53/346* (2013.01); *B01D 53/502* (2013.01); *B01D 53/504* (2013.01); *C02F 1/5245* (2013.01); *C02F 1/54* (2013.01); *B01D 2257/302* (2013.01); *C02F 2101/106* (2013.01); *C02F 2209/06* (2013.01); *C02F 2209/38* (2013.01)

(58) Field of Classification Search
CPC .......... B01D 2251/51; B01D 2257/302; B01D 2257/60; C02F 2101/106
See application file for complete search history.

(56) References Cited

U.S. PATENT DOCUMENTS

| | | | |
|---|---|---|---|
| 9,321,025 B2 | 4/2016 | Gansley et al. | |
| 2007/0278150 A1* | 12/2007 | Lupton | C02F 3/30 210/615 |
| 2009/0130013 A1* | 5/2009 | Higgins | C01F 11/464 423/242.1 |
| 2012/0189522 A1* | 7/2012 | Fan | B01D 53/504 423/243.01 |

(Continued)

FOREIGN PATENT DOCUMENTS

| | | |
|---|---|---|
| CN | 208229629 U | 12/2018 |
| JP | 2002126757 A | 5/2002 |

(Continued)

OTHER PUBLICATIONS

EPO Extended European Search Report for EP Application 20163451.6 dated Aug. 5, 2020; 9 pp.

*Primary Examiner* — Bradley R Spies
(74) *Attorney, Agent, or Firm* — Armstrong Teasdale LLP

(57) ABSTRACT

A method of reducing selenium contamination in a waste water stream is described herein. The method includes channeling a flue gas stream through an absorber, contacting the flue gas stream with an aqueous alkaline-based slurry, such that any selenium byproduct in the flue gas stream forms a selenium compound within the aqueous alkaline-based slurry, controlling oxidation of the selenium compound in the aqueous alkaline-based slurry, and adding a precipitation agent to the aqueous alkaline-based slurry to cause the selenium compound within the aqueous alkaline-based slurry to precipitate.

20 Claims, 2 Drawing Sheets

(56) References Cited

U.S. PATENT DOCUMENTS

2015/0273428 A1\* 10/2015 Gansley .............. B01J 19/0033
423/155
2018/0229179 A1   8/2018 Gansley
2019/0270657 A1\* 9/2019 Theodore ............. C02F 1/5245

FOREIGN PATENT DOCUMENTS

WO    2017196976 A1   11/2017
WO    2017222741 A1   12/2017

\* cited by examiner

SYSTEMS AND METHODS OF REDUCING SELENIUM CONTAMINATION IN WASTE WATER

BACKGROUND

The invention relates generally to power production and, more specifically, to systems and methods of controlling selenium contamination via sulfite control and wet flue gas desulfurization.

At least some known power plants generate energy derived from the combustion of carbon and hydrogen-containing fuels such as coal, oil, peat, waste, biofuel, natural gas, and the like. In addition to carbon and hydrogen, these fuels may contain oxygen, moisture, and contaminants. As such, the combustion of such fuels results in the production of a gas stream that may contain contaminants in the form of ash, carbon dioxide ($CO_2$), sulfur compounds (often in the forms of sulfur oxides, referred to as "SOx"), nitrogen compounds (often in the form of nitrogen oxides, referred to as "NOx"), chlorine compounds (often referred to as "HCl"), mercury, and/or other trace elements.

At least some known power plants use flue gas capture systems to facilitate removing the contaminants from the gas stream, prior to releasing them into the atmosphere. For example, some known power plants use flue gas desulfurization (FGD) systems to remove contaminants by contacting the gas stream with a slurry that facilitates absorbing sulfur compounds and trace elements such as selenium from the gas stream. The slurry, including the absorbed contaminants, is collected in the FGD system, and a waste water stream including a portion of the absorbed contaminants is discharged from the FGD system prior to receiving further treatment. However, it may be difficult and/or costly to remove certain contaminants from the waste water stream. As such, FGD systems may provide only limited results.

BRIEF DESCRIPTION

In one aspect, a method of reducing contamination in a waste water stream is provided. The method includes channeling a flue gas stream through an absorber, contacting the flue gas stream with an aqueous alkaline-based slurry, such that any selenium byproduct in the flue gas stream forms a selenium compound within the aqueous alkaline-based slurry, controlling oxidation of the selenium compound in the aqueous alkaline-based slurry, and adding a precipitation agent to the aqueous alkaline-based slurry to cause the selenium compound within the aqueous alkaline-based slurry to precipitate.

In another aspect, a flue gas desulfurization system is provided. The system includes an absorber including a reservoir configured to collect an aqueous alkaline-based slurry following contact with a flue gas stream, wherein the aqueous alkaline-based slurry includes a selenium compound dissolved therein. The selenium compound is derived from a selenium byproduct included within the flue gas stream. A sulfite sensor is configured to monitor a sulfite concentration of the aqueous alkaline-based slurry in the reservoir, and an air injection system is operatively coupled with the sulfite sensor, wherein the air injection system is configured to inject a stream of air into the reservoir at a flow rate determined as a function of the sulfite concentration. An additive injection system is coupled in flow communication with the reservoir, wherein the additive injection system is configured to supply a precipitation agent to the aqueous alkaline-based slurry, and wherein the precipitation agent is configured to precipitate the selenium compound within the aqueous alkaline-based slurry.

In yet another aspect, a power plant is provided. The power plant includes a boiler configured to generate a flue gas stream, wherein the flue gas stream includes a selenium byproduct, and a flue gas desulfurization system. The system includes an absorber including a reservoir configured to collect an aqueous alkaline-based slurry following contact with a flue gas stream, wherein the aqueous alkaline-based slurry includes a selenium compound dissolved therein. The selenium compound is derived from a selenium byproduct included within the flue gas stream. A sulfite sensor is configured to monitor a sulfite concentration of the aqueous alkaline-based slurry in the reservoir, and an air injection system is operatively coupled with the sulfite sensor, wherein the air injection system is configured to inject a stream of air into the reservoir at a flow rate determined as a function of the sulfite concentration. An additive injection system is coupled in flow communication with the reservoir, wherein the additive injection system is configured to supply a precipitation agent to the aqueous alkaline-based slurry, and wherein the precipitation agent is configured to precipitate the selenium compound within the aqueous alkaline-based slurry.

DETAILED DESCRIPTION

Figure 1:
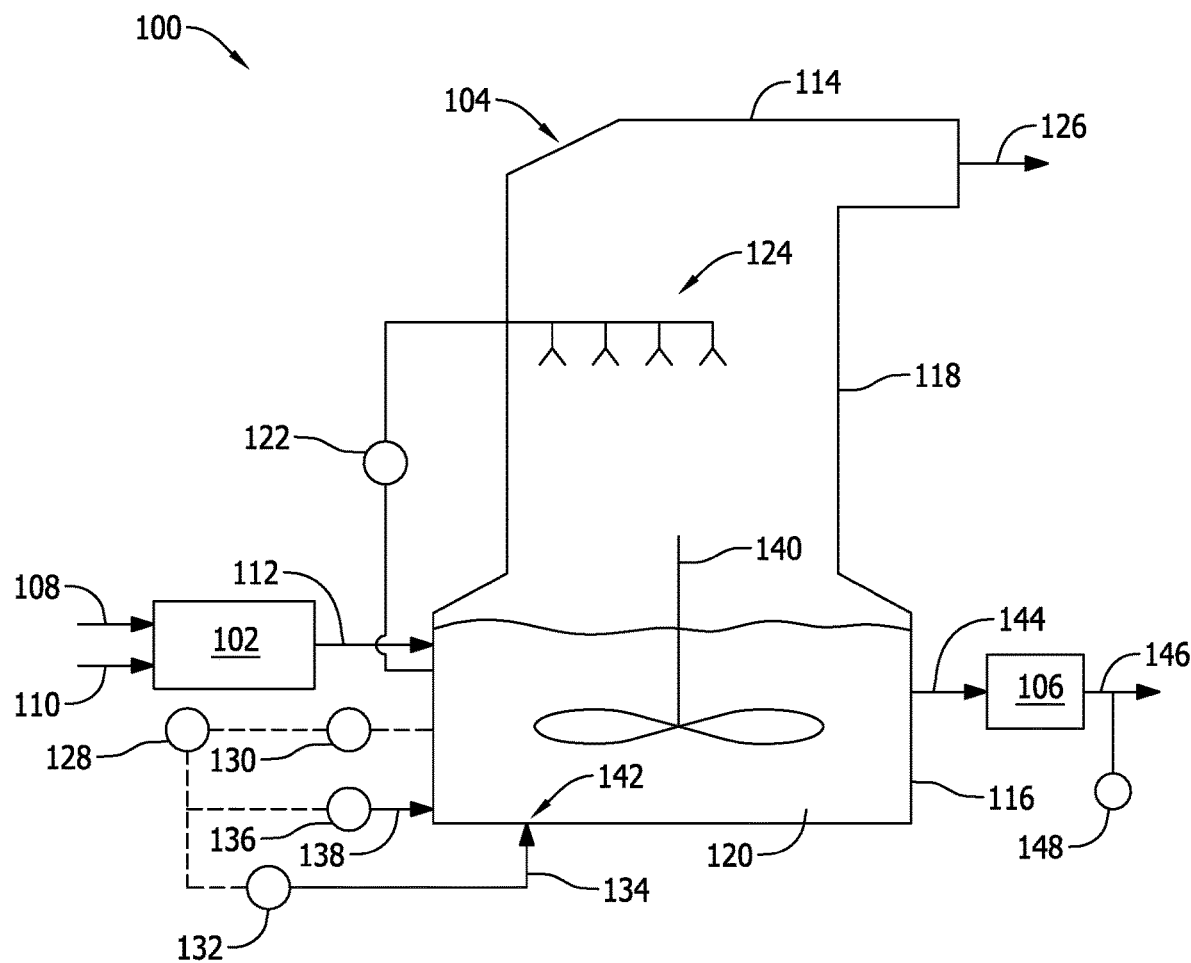
FIG. 1 is a schematic diagram of an exemplary power plant.

The embodiments described herein relate to systems and methods of controlling selenium contamination with sulfite control and wet flue gas desulfurization (FGD) in a power plant. In the exemplary embodiment, a flue gas stream is channeled through an absorber prior to it being contacted by an aqueous slurry to remove contaminants from the flue gas stream. For example, in at least some power plants, the flue gas may contain trace elements such as selenium in the form of selenium dioxide. The selenium dioxide is soluble in the slurry and becomes selenite when absorbed in the aqueous solution. The FGD system described herein introduces oxygen into the slurry collected at the bottom of the absorber to produce a marketable byproduct known as FGD gypsum-calcium sulfate ($CaSO_4.2H_2O$). Although such gypsum is useful, one adverse result of FGD gypsum production is the production of selenate created by the reaction of selenite in the slurry with oxygen. Selenate may be difficult and costly to remove from a waste water stream discharged from the FGD system. In addition to treatment with traditional waste water treatment processes, adequate treatment of selenate for required selenium discharge levels in a waste water stream may be enhanced by the addition of a bioreactor or a zero valent iron treatment step or other special treatment steps.

In the systems and methods described herein, oxidation of the slurry is controlled to facilitate reducing the production of selenate in the slurry. For example, reducing the amount of time that selenite in the slurry may contact oxygen facilitates reducing the production of selenate in the slurry. In addition, the FGD system described herein includes an additive injection system that adds a precipitation agent to the slurry. The precipitation agent reacts with the selenite in the slurry to precipitate the selenite as selenium sulfide, elemental selenium, or other selenium solid compound before it can be oxidized to become selenate. As such, precipitating the selenium greatly reduces the dissolved selenium in the FGD liquid phase and thus reduces dissolved selenium in the FGD aqueous discharge to a waste water treatment system. Solid selenium precipitates in the FGD slurry will also in part be removed with the gypsum solids from the process. As such, remaining selenium precipitated solids or dissolved selenite in the FGD aqueous discharge can be more readily removed with traditional waste water treatment processes to ensure selenium levels in the treated waste water stream are reduced to below a threshold level.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a rotary machine, and the term "downstream" refers to a downstream or exhaust end of the rotary machine.

FIG. 1 is a schematic diagram of an exemplary power plant 100. In the exemplary embodiment, power plant 100 includes, in a serial flow relationship, a boiler 102, a wet flue gas desulfurization (WFGD) system 104, and a waste water treatment system (WWTS) 106. In operation, fuel 108, such as coal, natural gas, or other fossil fuel, is supplied to boiler 102 in addition to a supply of air 110. Boiler 102 combusts fuel 108 and air 110 to produce a flue gas stream 112 that may include carbon dioxide ($CO_2$), sulfur compounds (SOx), nitrogen compounds (NOx), chlorine compounds (HCl), hydrofluoric acid (HF), fly ash particulates, mercury, and/or other trace elements such as selenium. Flue gas stream 112 is channeled towards WFGD system 104 to facilitate the removal of contaminants from flue gas stream 112.

In the exemplary embodiment, WFGD system 104 includes an absorber 114. Absorber 114 includes a reservoir 116 and a scrubber tower 118 that extends vertically from reservoir 116. Reservoir 116 contains an aqueous alkaline-based slurry 120 that is channeled through WFGD system 104 to contact flue gas stream 112. More specifically, WFGD system 104 includes one or more pumps 122, and a plurality of nozzles 124 positioned in scrubber tower 118. Pump 122 channels slurry 120 from reservoir 116 through nozzles 124, which discharge the slurry towards flue gas stream 112. The amount of slurry 120 channeled to nozzles 124 may depend upon several factors such as, but not limited to, an amount of flue gas present in the scrubber tower 118, an amount of contaminants in flue gas stream 112, and/or the overall design of the WFGD system 104.

Flue gas stream 112 is channeled into absorber 114 such that flue gas stream 112 rises through scrubber tower 118 and is contacted by slurry 120. In the exemplary embodiment, nozzles 124 discharge slurry 120 within scrubber tower 118 to facilitate removing contaminants, such as sulfur oxides and selenium oxides, from flue gas stream 112. In some embodiments, the contaminants may be soluble within slurry 120 to facilitate the removal of contaminants from flue gas stream 112 such that a cleaned flue gas stream 126 is formed. In such embodiments, cleaned flue gas stream 126 is discharged from absorber 114, and slurry 120 containing contaminants entrained therein is collected within reservoir 116. Slurry 120 may then be recirculated to nozzles 124 via pump 122.

In the exemplary embodiment, WFGD system 104 also includes a controller 128, a sulfite sensor 130, and an air injection system 132. Controller 128 is coupled with sulfite sensor 130 and air injection system 132, such that sulfite sensor 130 and air injection system 132 are also coupled with each other. Controller 128 may include, for example, a computer, a microprocessor, an application specific integrated circuit, circuitry, or any other device capable of transmitting and receiving electrical signals from various sources, at least temporarily storing data associated with the signals, and performing mathematical and/or logical operations on the data. Controller 128 may include, or may be connected to a monitor, a keyboard, or other type of user interface, and an associated memory device.

Sulfite sensor 130 senses slurry 120 in reservoir 116, and monitors a sulfite concentration of slurry 120 in reservoir 116. For example, sulfite sensor 130 may measure sulfite concentration levels in slurry 120 either continuously or at predetermined intervals. The predetermined intervals may be determined automatically by controller 128 or set manually by a user. Although the use of sulfite sensor 130 is described herein, the sulfite concentration level may be determined by other means, such as, for example, on-line or periodic chemical analysis or other known methods.

In the exemplary embodiment, air injection system 132 injects a stream of oxidation air 134 into reservoir 116 at a flow rate determined based on the measured sulfite concentration. For example, controller 128 may compare the measured sulfite concentration to one or more predetermined sulfite concentration levels as a set point. It is contemplated that the predetermined sulfite concentration levels may include a single value or a range of values. The predetermined level(s) may be a user-input parameter. For example, the predetermined sulfite concentration values may range from about 5 mg/L to about 125 mg/L, or from about 20 mg/L to about 50 mg/L. In operation, controller 128 provides a control signal to air injection system 132 based on the comparison of the measured sulfite concentration to the predetermined sulfite concentration levels. The control signal causes air injection system 132 to adjust the flow rate of the stream of oxidation air 134 introduced into slurry 120 within reservoir 116. More specifically, the flow rate of the stream of oxidation air 134 into reservoir 116 is adjusted to facilitate maintaining a desired sulfite level in slurry 120. As such, the formation of undesirable contaminant compounds, such as selenate, in slurry 120 is reduced.

For example, as noted above, oxidation air 134 reacts with the contaminants dissolved in slurry 120 to create certain undesirable contaminant compounds (e.g., selenate). In the exemplary embodiment, sulfur dioxide in flue gas stream 112 reacts with slurry 120 to create sulfites in the aqueous phase, and selenium dioxide ("selenium byproduct") in flue gas stream 112 reacts with slurry 120 to create selenite ("selenium compound") in the aqueous phase. The sulfites and the selenite are soluble in the slurry 120 drawn downwardly through scrubber tower 118 and then collected in reservoir 116. Injection of oxidation air 134 into reservoir 116 facilitates converting sulfite into sulfate, which then reacts with calcium to form FGD gypsum, and facilitates converting selenite to selenate. Injecting the stream of oxidation air 134 at a higher flow rate facilitates reducing sulfite concentration levels and increasing selenate creation, and injecting the stream of oxidation air 134 at a lower flow rate facilitates increasing sulfite concentration levels and reducing selenate creation. As such, monitoring the sulfite concentration of slurry 120 and controlling air injection based on the sulfite concentration enables selenate concentration levels in slurry 120 to be maintained at low levels. For example, a system without sulfite control would typically oxidize more than 90% of the selenium in the slurry to selenate. In one embodiment, controller 128 adjusts the flow rate of the stream of oxidation air 134 to maintain a concentration of selenite and precipitated selenite at greater than about 90 percent by weight of the total selenium in slurry 120, and to maintain a concentration of selenate at less than about 10 percent by weight of selenium in slurry 120. As used herein, "precipitated selenite" is any of the solid selenium compounds that can precipitate including selenium sulfide, elemental selenium, or other solid selenium compounds In some embodiments, the pH level of slurry 120 is maintained within a predetermined range that facilitates the precipitation of selenite in slurry 120. For example, the pH may be monitored continuously, and an alkali reagent added to maintain a pH set point or a pH range. For instance, the pH set point may be selected as a set value, and the system would maintain the pH level within approximately +/−0.1 pH units. In one embodiment, the pH level may be defined within a predetermined range between about 4.4 and about 6.8, or within a predetermined range between about 5.0 and about 6.0.

In the exemplary embodiment, WFGD system 104 includes an additive injection system 136 coupled in flow communication with reservoir 116. Additive injection system 136 supplies a flow of precipitation agent 138 to slurry 120. Precipitation agent 138 may be any substance that enables WFGD system 104 to function as described herein. Exemplary precipitation agents include, but are not limited to, an organosulfide, sodium sulfide, hydrogen sulfide, or zerovalent iron. Precipitation agent 138 facilitates precipitating selenite within slurry 120 before it can oxidize to become selenate.

Absorber 114 includes an agitator 140 positioned within reservoir 116. Agitator 140 is rotatable within reservoir 116 to facilitate dispersing precipitation agent 138 within slurry 120. In one embodiment, oxidation air 134 is introduced into reservoir 116 at one or more air injection sites 142. As noted above, injection of oxidation air 134 into reservoir 116 facilitates converting selenite to selenate. As such, agitator 140 mixes slurry 120 in reservoir 116 such that precipitation agent 138 is present at air injection sites 142, and such that selenite is precipitated before it can reach air injection sites 142. Thus, the creation of selenate is facilitated to be inhibited within reservoir 116.

In the exemplary embodiment, a waste water stream 144, formed from slurry 120, is discharged from absorber 114. Waste water stream 144 includes, among other things, precipitated selenite created as a result of the introduction of precipitation agent 138 into slurry 120. WWTS 106 is downstream from absorber 114, and receives waste water stream 144 therein. WWTS 106 facilitates removal of the precipitated selenite from waste water stream 144 using any mechanism that enables power plant 100 to function as described herein. For example, in one embodiment, WWTS 106 includes a clarifier (not shown) that separates the solid and liquid components of waste water stream 144 via sedimentation. As such, a clarified waste water stream 146 that is substantially free of precipitated selenite is discharged from WWTS 106. In an alternative embodiment, WWTS 106 also includes means for adding additional precipitation agent to waste water stream 144 for use in further precipitating and removing any selenite that remains in the aqueous phase of waste water stream 144.

A sensor 148 is coupled in flow communication with clarified waste water stream 146. Sensor 148 monitors a selenium concentration in clarified waste water stream 146, and selenium concentration data obtained by sensor 148 may be used to ensure selenium levels in clarified waste water stream 146 are reduced below a threshold level. Alternatively the selenium concentration is monitored by taking periodic samples of clarified waste water stream 146 and analyzing the samples in a laboratory.

Figure 2:
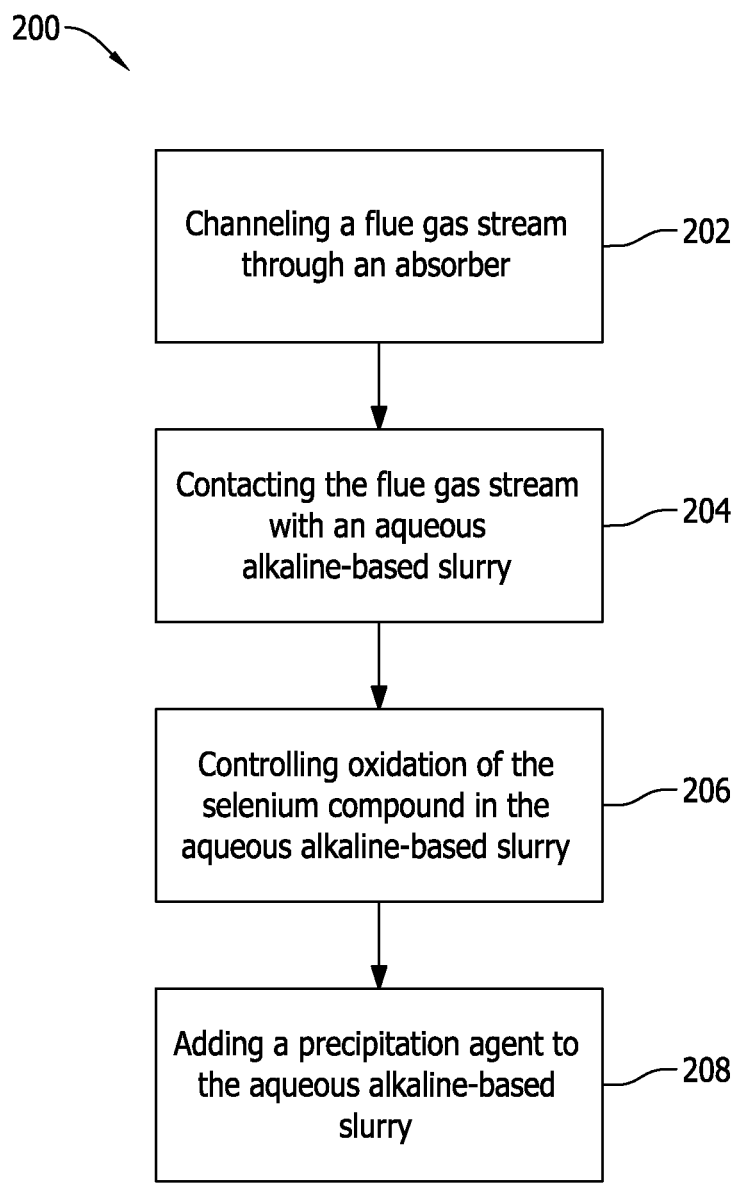
FIG. 2 is a flow diagram illustrating an exemplary method of reducing selenium contamination in waste water.

FIG. 2 is a flow diagram illustrating an exemplary method 200 of reducing selenium contamination in waste water stream 144. Initially, flue gas stream 112 is channeled 202 through absorber 114. The flue gas stream 112 includes a selenium byproduct, such as selenium dioxide. Flue gas stream 112 is contacted 204 with aqueous alkaline-based slurry 120, wherein the selenium byproduct is soluble within aqueous alkaline-based slurry 120 to form a selenium compound, such as selenite. Method 200 also includes controlling 206 oxidation of the selenium compound in aqueous alkaline-based slurry 120, and adding 208 a precipitation agent to aqueous alkaline-based slurry 120, wherein the precipitation agent is configured to precipitate the selenium compound within the aqueous alkaline-based slurry 120.

The embodiments described herein relate to systems and methods of controlling selenium contamination with sulfite control and wet flue gas desulfurization (FGD) in a power plant. The systems and methods described herein accomplish the aforementioned objectives by precipitating selenite in slurry before it can be converted to selenate, and by reducing the amount of time that selenite in the slurry may contact oxygen. As such, the selenite precipitate, which may be removed in part with the gypsum solids, can be more readily removed with traditional waste water treatment processes to ensure selenium levels in the waste water stream are reduced to below a threshold level.

The above description is meant to be exemplary only, and one skilled in the art will recognize that changes may be made to the embodiments described without departing from the scope of the invention disclosed. For example, the WFGD system may be modified to facilitate removal of other contaminants from a flue gas stream. Still other modifications which fall within the scope of the present invention will be apparent to those skilled in the art, in light of a review of this disclosure, and such modifications are intended to fall within the appended claims.

Exemplary embodiments of a flue gas desulfurization system are described above in detail. The system is not limited to the specific embodiments described herein, but rather, components of the system may be utilized independently and separately from other components described herein. For example, the systems and methods of reducing selenium contamination in a waste water stream are not limited to practice with only a flue gas desulfurization system as described herein. Rather, the exemplary embodiment can be implemented and utilized in connection with many other power plant applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A method of reducing contamination in a waste water stream, the method comprising:
    channeling a flue gas stream through an absorber;
    contacting the flue gas stream with an aqueous alkaline-based slurry, such that any selenium byproduct in the flue gas stream forms into selenite, in an aqueous phase, within the aqueous alkaline-based slurry;
    controlling oxidation of the selenite in the aqueous alkaline-based slurry; and
    adding a precipitation agent to the aqueous alkaline-based slurry, wherein the precipitation agent is configured to react with and cause the selenite to precipitate from the aqueous phase to solidify into at least one of selenium sulfide, elemental selenium, or other solid selenium compounds.

2. The method in accordance with claim 1, wherein controlling oxidation of the selenite comprises:
    monitoring, with a sulfite sensor, a sulfite concentration in the aqueous alkaline-based slurry; and
    adjusting a flow rate of air injected into the aqueous alkaline-based slurry based on the sulfite concentration.

3. The method in accordance with claim 2, wherein monitoring a sulfite concentration comprises comparing a measured sulfite concentration taken by the sulfite sensor to a predetermined sulfite concentration.

4. The method in accordance with claim 1, wherein controlling oxidation of the selenite comprises maintaining a concentration of the selenite or precipitated selenite in the slurry at greater than about 90% by weight of the total selenium in the aqueous alkaline-based slurry, wherein the total selenium is further defined by a concentration of selenate in the aqueous alkaline-based slurry.

5. The method in accordance with claim 1, wherein adding a precipitation agent comprises:
    collecting the aqueous alkaline-based slurry in a reservoir within the absorber following contact with the flue gas stream; and
    dispersing the precipitation agent within the aqueous alkaline-based slurry in the reservoir.

6. The method in accordance with claim 5, wherein dispersing the precipitation agent comprises mixing the aqueous alkaline-based slurry such that the precipitation agent is present at air injection sites within the reservoir.

7. The method in accordance with claim 1 further comprising:
    discharging a waste water stream, formed from the aqueous alkaline-based slurry, from the absorber; and
    monitoring a selenium concentration in the waste water stream; and
    removing the precipitate from the waste water stream.

8. The method in accordance with claim 1 further comprising maintaining the aqueous alkaline-based slurry at a pH level defined within a predetermined range.

9. The method in accordance with claim 1, wherein adding a precipitation agent comprises adding the precipitation agent that includes at least one of an organosulfide, sodium sulfide, hydrogen sulfide, or zerovalent iron.

10. A flue gas desulfurization system comprising:
    an absorber comprising a reservoir configured to collect an aqueous alkaline-based slurry following contact with a flue gas stream, wherein the aqueous alkaline-based slurry includes selenite dissolved therein in an aqueous phase, the selenite derived from a selenium byproduct included within the flue gas stream;
    a sulfite sensor configured to monitor a sulfite concentration of the aqueous alkaline-based slurry in the reservoir;
    an air injection system operatively coupled with the sulfite sensor, wherein the air injection system is configured to inject a stream of air into the reservoir at a flow rate determined as a function of the sulfite concentration; and
    an additive injection system coupled in flow communication with the reservoir, wherein the additive injection system is configured to supply a precipitation agent to the aqueous alkaline-based slurry, wherein the precipitation agent is configured to react with and cause the selenite to precipitate from the aqueous phase to solidify into at least one of selenium sulfide, elemental selenium, or other solid selenium compounds.

11. The system in accordance with claim 10 further comprising a controller communicatively coupled to the sulfite sensor and the air injection system, wherein the controller is configured to compare a measured sulfite concentration taken by the sulfite sensor to a predetermined sulfite concentration, and configured to adjust a flow rate of the stream of air injected into the reservoir based on the comparison.

12. The system in accordance with claim 11, wherein the controller is further configured to adjust the flow rate of the stream of air to maintain a concentration of the selenite or precipitate at greater than about 90% by weight of the total selenium in the aqueous alkaline-based slurry, wherein the total selenium is further defined by a concentration of selenate in the aqueous alkaline-based slurry.

13. The system in accordance with claim 10, wherein the absorber comprises an agitator positioned within the reservoir, and configured to disperse the precipitating agent within the aqueous alkaline-based slurry.

14. The system in accordance with claim 10 further comprising a sensor configured to monitor a selenium concentration in a waste water stream discharged from the absorber.

15. A power plant comprising:
    a boiler configured to generate a flue gas stream, wherein the flue gas stream includes a selenium byproduct; and
    a flue gas desulfurization system comprising:
        an absorber comprising a reservoir configured to collect an aqueous alkaline-based slurry following contact with the flue gas stream, wherein the aqueous alkaline-based slurry includes selenite dissolved therein in an aqueous phase, the selenite derived from the selenium byproduct;
        a sulfite sensor configured to monitor a sulfite concentration of the aqueous alkaline-based slurry in the reservoir;
        an air injection system communicatively coupled with the sulfite sensor, wherein the air injection system is configured to inject a stream of air into the reservoir at a flow rate determined as a function of the sulfite concentration; and an additive injection system coupled in flow communication with the reservoir, wherein the additive injection system is configured to supply a precipitation agent to the aqueous alkaline-based slurry, wherein the precipitation agent is configured to react with and cause the selenite to precipitate from the aqueous phase to solidify into at least one of selenium sulfide, elemental selenium, or other solid selenium compounds.

16. The power plant in accordance with claim 15 further comprising a controller communicatively coupled to the sulfite sensor and the air injection system, wherein the controller is configured to compare a measured sulfite concentration taken by the sulfite sensor to a predetermined sulfite concentration, and configured to adjust a flow rate of the stream of air injected into the reservoir based on the comparison.

17. The power plant in accordance with claim 16, wherein the controller is further configured to adjust the flow rate of the stream of air to maintain a concentration of the selenite or precipitate at greater than about 90% by weight of the total selenium in the aqueous alkaline-based slurry, wherein the total selenium is further defined by a concentration of selenate in the aqueous alkaline-based slurry.

18. The power plant in accordance with claim 15, wherein the absorber comprises an agitator positioned within the reservoir, and configured to disperse the precipitation agent within the aqueous alkaline-based slurry.

19. The power plant in accordance with claim 15 further comprising a sensor configured to monitor a selenium concentration in a waste water stream discharged from the absorber.

20. The method in accordance with claim 3, wherein the monitoring comprises comparing the measured sulfite concentration to the predetermined sulfite concentration defined within a range between about 20 mg/L and about 50 mg/L.

* * * * *